US 6,743,366 B2

(12) United States Patent
Telfer et al.

(10) Patent No.: US 6,743,366 B2
(45) Date of Patent: Jun. 1, 2004

(54) REMOVAL OF CELL GROWTH FROM A BODY OF WATER

(76) Inventors: David Brian Telfer, 48/22 Jennifer Avenue, Gold Coast, Queensland, 4216 (AU); Terence Edward Morris, 9 Ouyan Street, Bundall, Queensland, 4217 (AU)

( * ) Notice: Subject to any disclaimer, the term of this patent is extended or adjusted under 35 U.S.C. 154(b) by 83 days.

(21) Appl. No.: 10/158,899

(22) Filed: Jun. 3, 2002

(65) Prior Publication Data

US 2002/0195395 A1 Dec. 26, 2002

Related U.S. Application Data

(63) Continuation-in-part of application No. 09/432,650, filed as application No. PCT/AU98/00364 on May 19, 1998, now abandoned.

(30) Foreign Application Priority Data

May 19, 1997 (AU) .............................................. PO6886

(51) Int. Cl.[7] .............................. B01D 35/06; C02F 1/48
(52) U.S. Cl. ........................ 210/695; 210/222; 210/748; 422/22; 204/554; 204/557; 204/660; 204/664
(58) Field of Search ................................. 210/222, 695, 210/748; 422/22; 204/554, 557, 660, 664

(56) References Cited

U.S. PATENT DOCUMENTS

| 3,753,886 A | 8/1973 | Myers |
| 4,524,079 A | 6/1985 | Hofmann |
| 5,326,446 A | 7/1994 | Binger |
| 5,326,530 A | 7/1994 | Bridges |

FOREIGN PATENT DOCUMENTS

| GB | 2240732 A | 8/1991 |
| JP | 07080467 A | 9/1993 |
| WO | WO 93/08127 | 4/1993 |
| WO | WO 94/07790 | 4/1994 |

Primary Examiner—David A. Reifsnyder
(74) Attorney, Agent, or Firm—Hoffman Wasson & Gitler PC

(57) ABSTRACT

The invention provides a method of and apparatus for the removal of bacteria, microbes and other cell growth from a body of water by the application of an electromagnetic signal to a section of pipe communicable with the body of water.

14 Claims, 8 Drawing Sheets

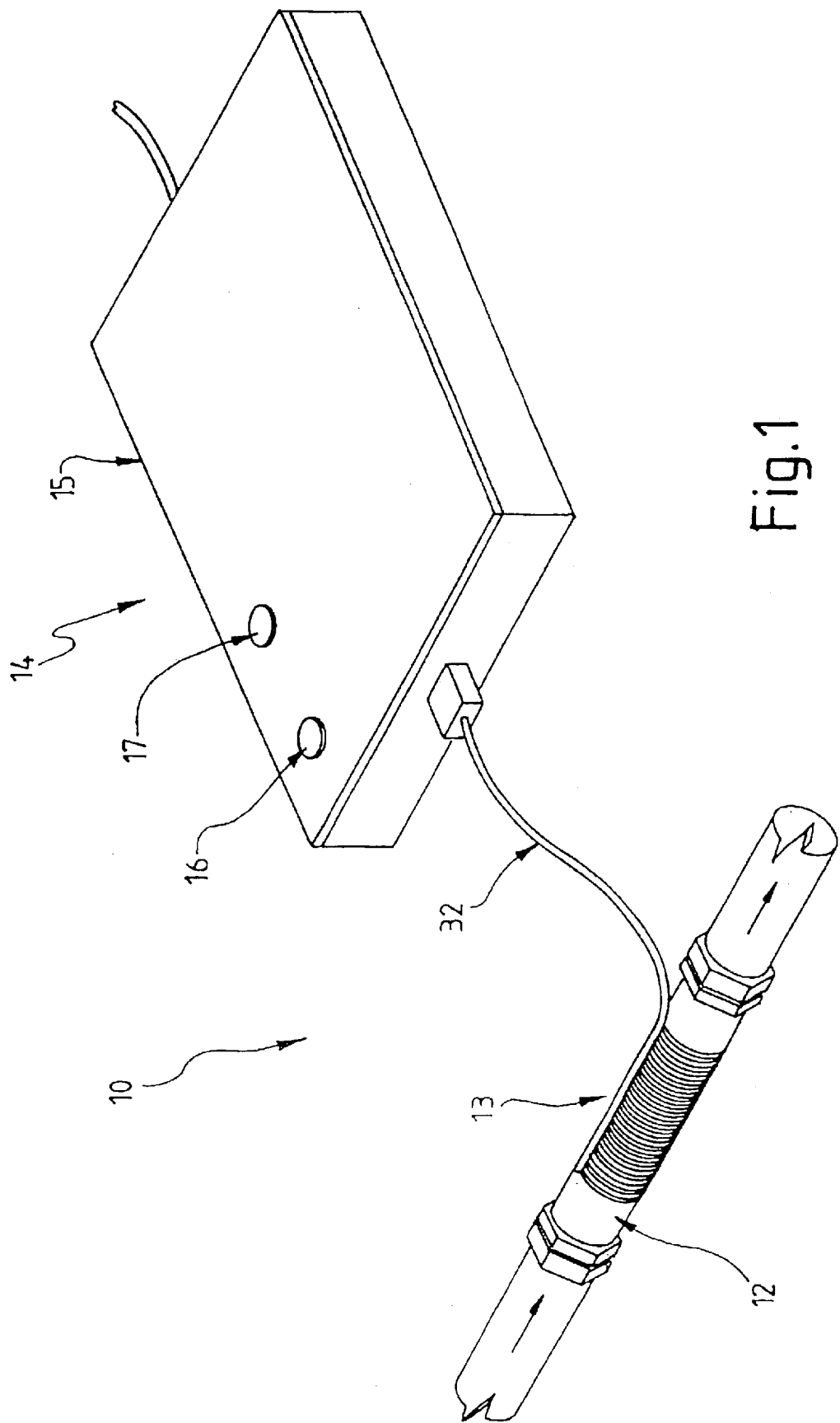

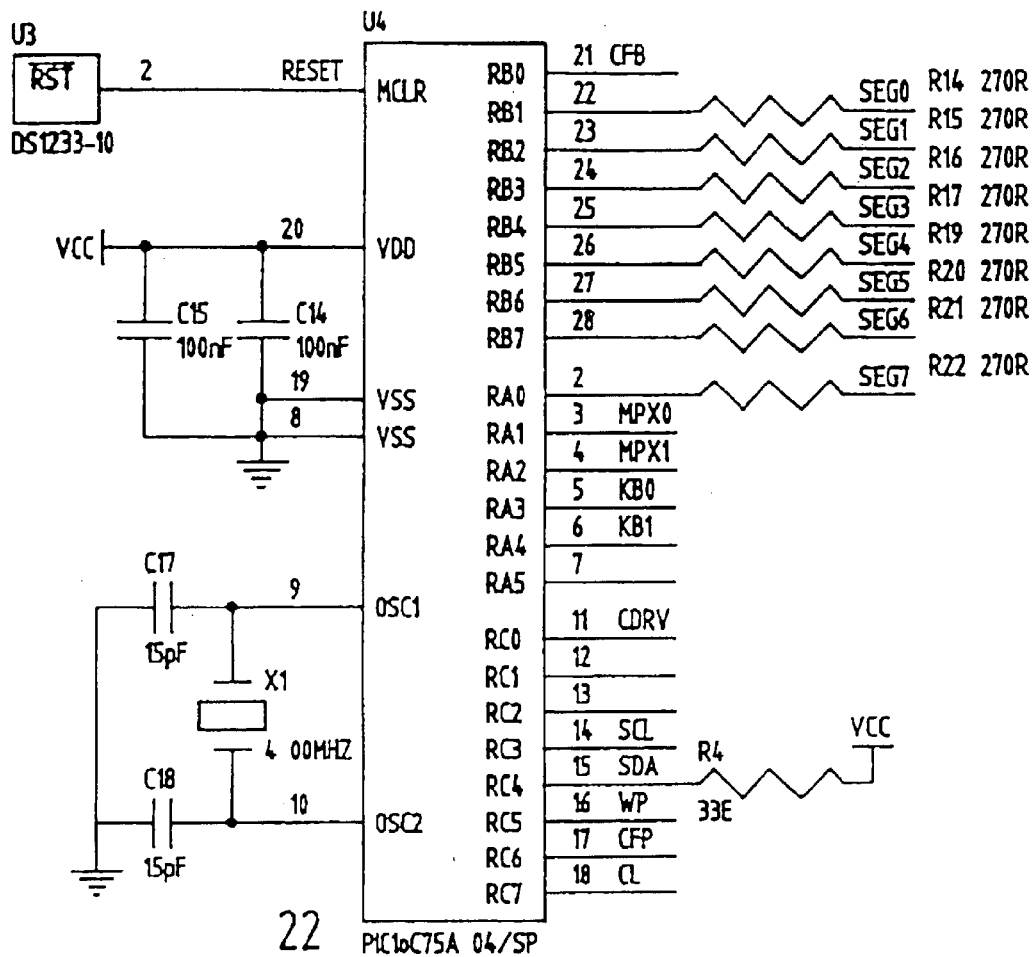
Fig. 4A
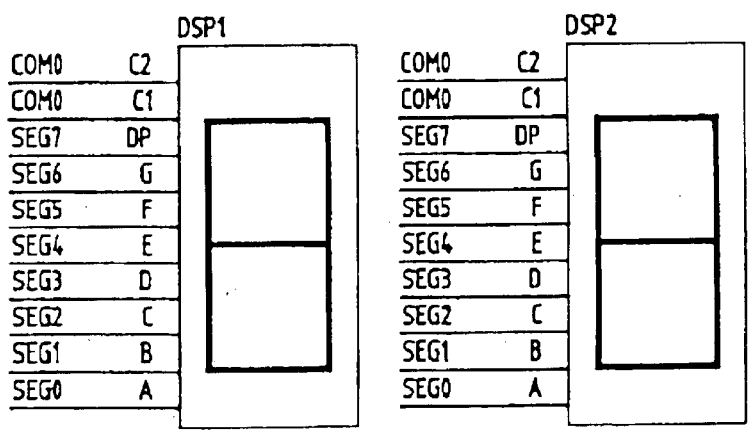

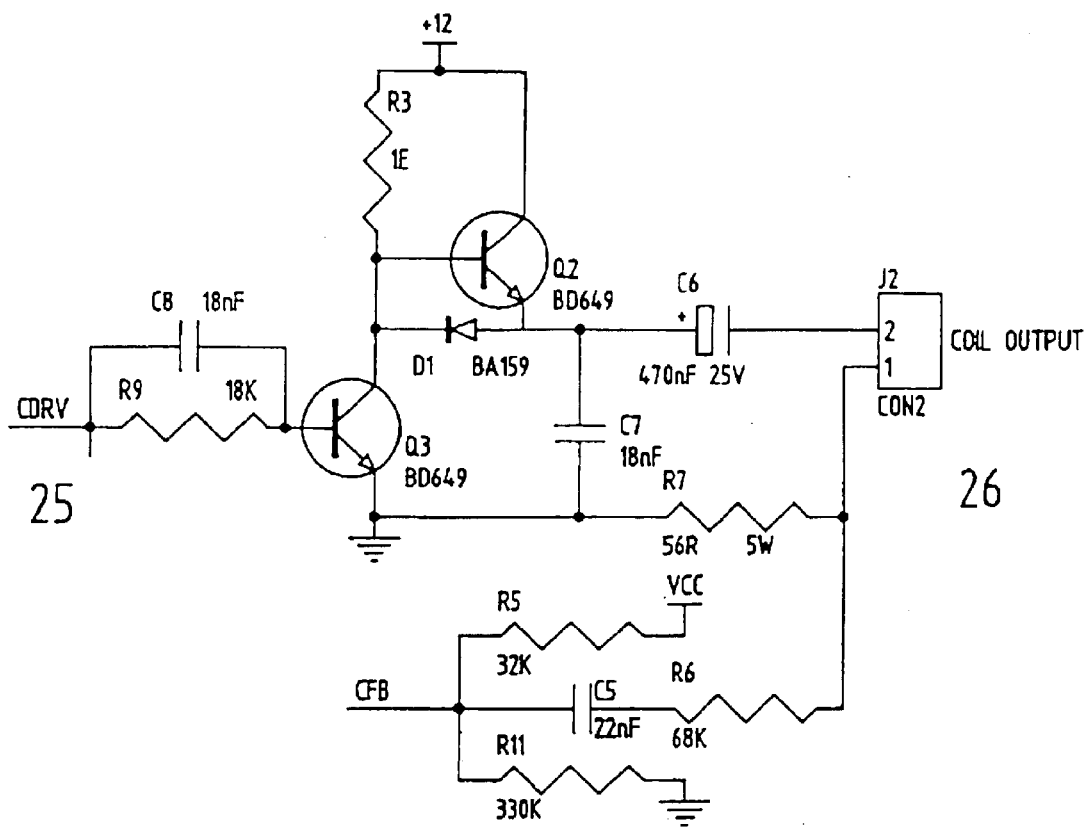
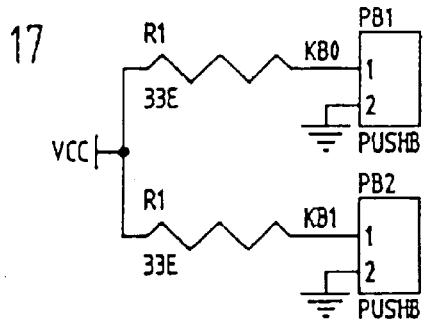
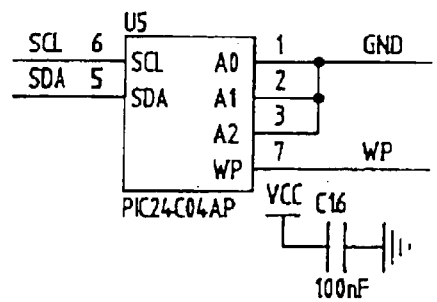
Fig. 4B
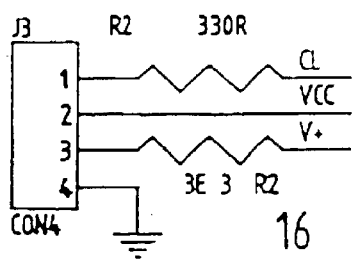

REMOVAL OF CELL GROWTH FROM A BODY OF WATER

This application is a continuation-in-part application of Ser. No. 09/432,650, filed Apr. 3, 2000 which is a 371 of PCT/AU98/00364, filed May 19, 1998 now abandoned.

TECHNICAL FIELD

This invention relates to a method and apparatus for the cleansing of bodies of water such as swimming pools, reservoirs, dams and the like. In particular, it is directed to the removal of bacteria, microbes and other cell growth from water.

BACKGROUND ART

Large bodies of water such as swimming pools, water catchment areas and similar where the water therein is to be in subsequent contact with people (either by swimming or bathing in the body of water, or by drinking the water) requires cleansing. Although various filters incorporating a filtration medium such as sand can be used to remove particulate matter and other solid debris, the removal of harmful bacteria and other microbiological growth is more difficult. Such bacteria and the like are usually removed by regularly dosing the body of water with a suitable chemical. For example, sodium hypochlorite is commonly added to swimming pools to maintain the dissolved chlorine content of the water at a level which is lethal to any bacteria and the like which is present in the water. In municipal works, where a body of water has to be purified to drinking water standards, a large range of chemicals may be added to the water to purify it.

There are a number of disadvantages to these existing methods. Swimming pools usually cannot be used until some period after treatment because the chlorine content necessary to purify the water often irritates the eyes of any person in the pool. In drinking water treatment, there is increasing concern by the community that the deliberate addition fo chemicals into the water supply is harmful in itself. for example, it can lead to allergic reactions in some consumers of the treated water. Therefore, for an increasing number of consumers, it is necessary to filter or otherwise further treat the supplied water before it can be used or consumed. Of course, the use of chemicals and/or further treatment of supplied water all ad to the financial costs of maintaining an acceptable supply of water for use by the community.

It is thus a general object of the present invention to overcome, or at least ameliorate, one or more of the above disadvantages.

DISCLOSURE OF INVENTION

According to the present invention there is provided a method of for the removal of bacteria, microbes and other cell growth from a body of water, said method comprising:
applying an electromagnetic field to a section of said pipe or similar conduit communicable with the body of water as water passes therethrough, said electromagnetic field having a frequency or a range of frequencies sufficient to inhibit or remove said bacteria, microbes or other cell growth from said water.

The application of the electromagnetic field to said section of pipe can be achieved by magnetizing an element or elements positioned on the wall of the pipe or conduit.

Four equally spaced elements can be placed on the wall of the pipe or conduit.

The elements can be elongate strips of ferrite material.

The ferrite material can be manganese-zinc.

The element can be a magnetizable coil.

According to a further aspect of the present invention there is provided apparatus for the removal of bacteria, microbes and other cell growth from a body of water, said apparatus comprising:
a magnetizable element adapted to be disposed about a section of a pipe communicable with the body of water;
means for applying a signal to said magnetizable element to create an electromagnetic field within said pipe, said electromagnetic field having a frequency or a range of frequencies sufficient to inhibit or remove said bacteria, microbes or other cell growth from said water.

The magnetizable element can comprise one or more ferrite elements placed on the wall of the section of pipe.

The one or more ferrite elements can be manganese-zinc elements.

The magnetizable element can be a coil for application of the electromagnetic field to the pipe or conduit the coil being wound about a polyvinyl chloride (PVC) or other non-ferrous former which is located coaxially about the pipe or conduit.

An AC voltage can be applied to the magnetizable element to generate the electromagnetic field.

The voltage can be 5 volts AC.

The frequency of the voltage applied to the magnetizable element can vary to sweep a range of frequencies in the range of 2 KHz to 7 KHz.

The signal applied to the magnetizable element can be in the form of a positive going square wave followed by a negative going spike having a variable frequency.

The means for generating the signal can comprise first and second square wave oscillators whereby the output of the second oscillator is modulated in frequency by the output of the first oscillator.

The signal generating means can include a third square wave oscillator whereby the output of the second oscillator is used to frequency modulate the output of the third square wave oscillator.

Amplifier means can be employed for amplifying the output of the third square wave oscillator, the output of the amplifier means is adapted to be connected to the magnetizable element via capacitance means to define the required form of the signal.

BRIEF DESCRIPTION OF THE DRAWINGS

In order that the invention may be more readily understood and put into practical effect, reference will now be made to the accompanying drawings which illustrate a preferred embodiment of the invention and wherein:

FIG. 1 illustrates the general nature of the apparatus constructed according to the present invention;

DETAILED DESCRIPTION OF THE INVENTION

Figure 2A:
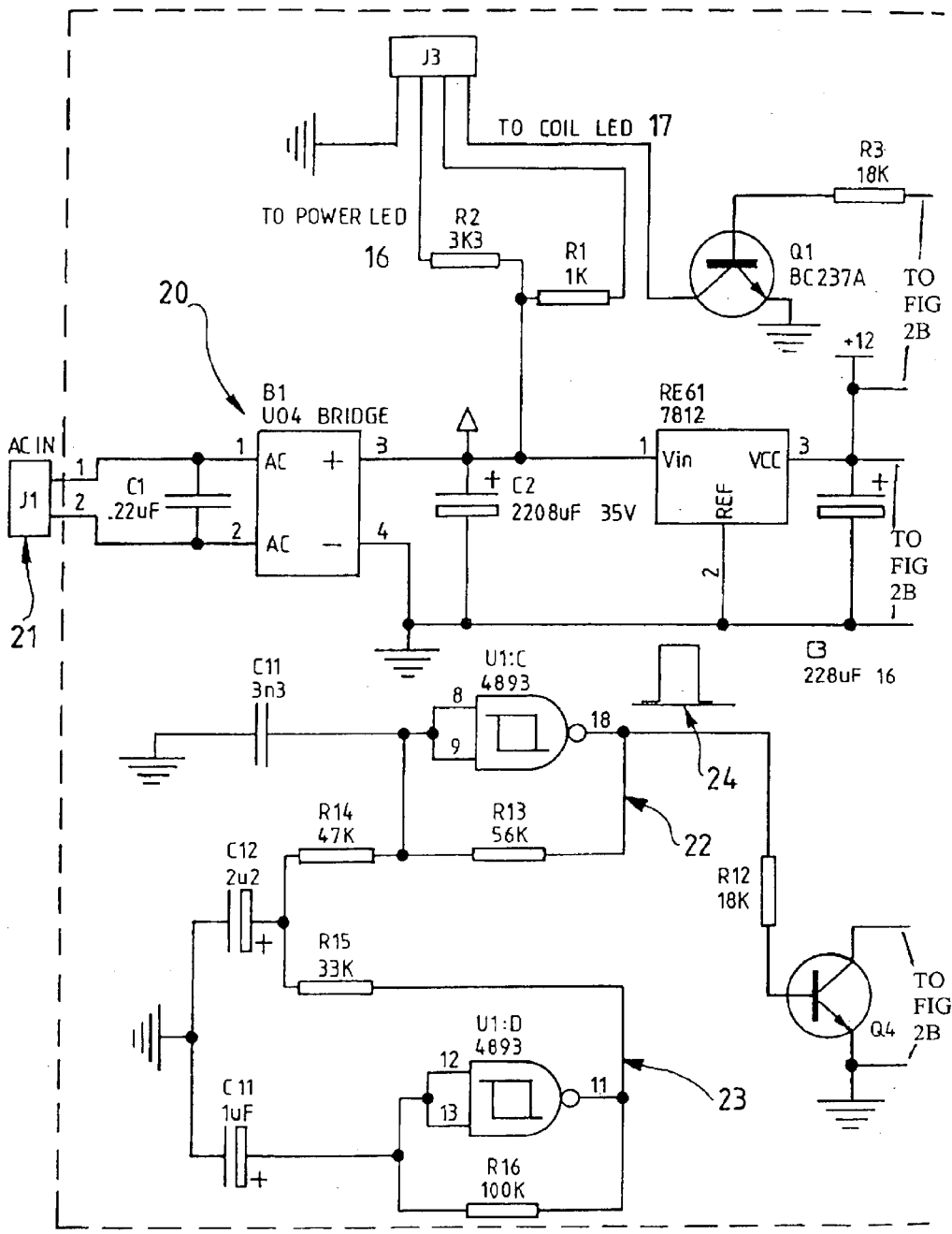
FIG. 2 is a circuit diagram of the circuit for generating and applying a signal to a pipe with water flowing therethrough.
Figure 2B:
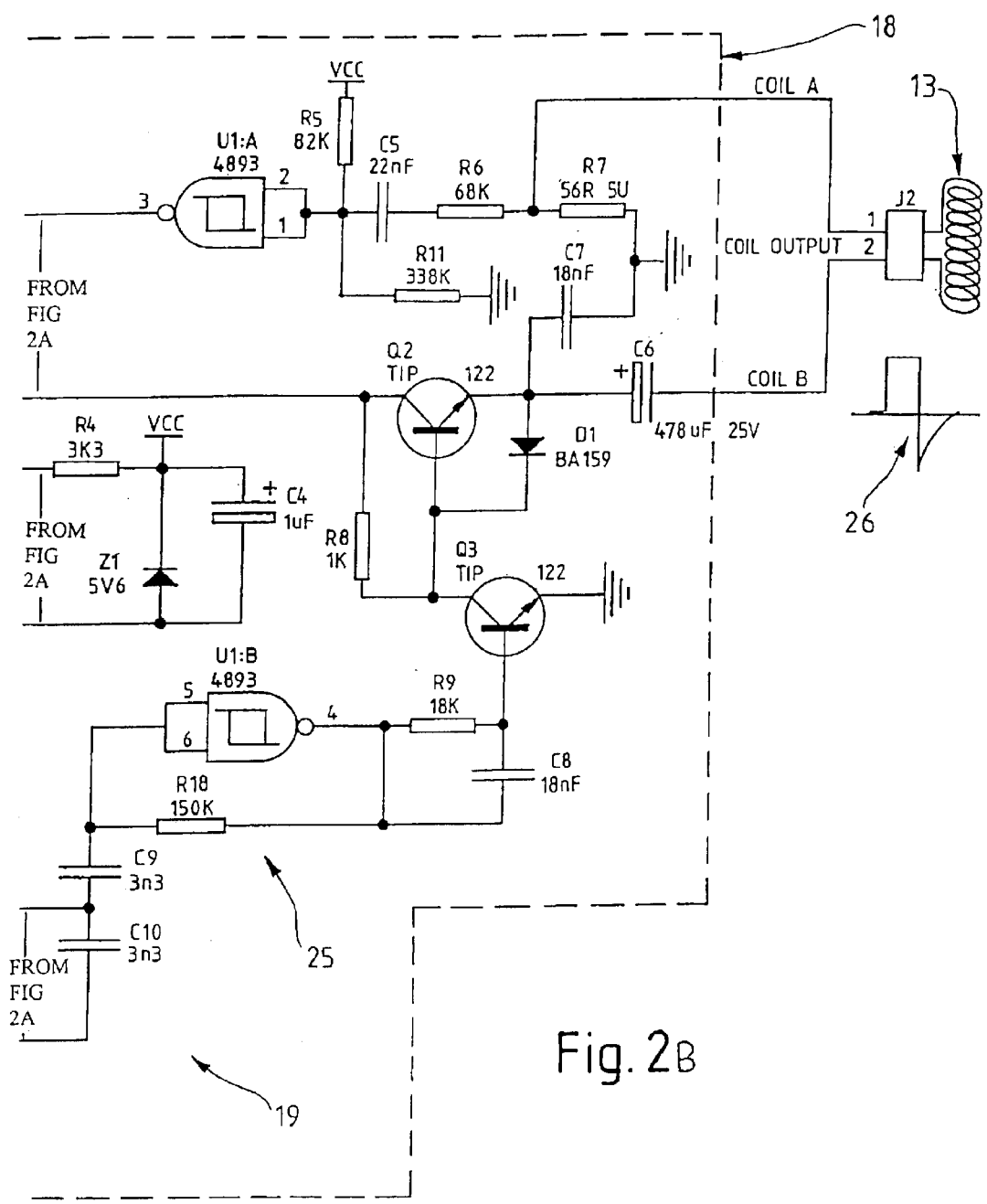

Referring firstly to FIG. 1, there is illustrated an apparatus 10 comprising a former 12 manufactured from a non-magnetic non-ferrous material such as a plastics material and preferably a polyvinyl chloride (PVC). Wound about the former 12 are a plurality of turns of wire forming to a coil 13 which is connected to receive a signal from a signal generator 14.

The former 12 is preferably 40 mm in diameter having wound thereon three layers of 0.315 mm insulated copper wire extending approximately 170 mm along the former 12. The former 12 may be provided with an outer casing to surround the windings or the layers of wire may be provided with a shrink sleeving.

The coil is adapted to be connected to a signal generator is housed within a casing 15 provided with an indicator 16 in the form of a light emitting diode (LED) which indicates circuit operation and a further indicator 17 in the form of a light emitting diode (LED) which indicates power supply to the apparatus 10. Mounted within the casing 15 is a circuit board 18 which carries the components of the signal generating circuit 19 and associated power supply 20.

The power supply 20 includes a bridge rectifier B1 and capacitor C1 which are arranged to be connected to an AC supply 21 to provide a pulsating DC voltage at the output of the rectifier B1 at a frequency in this embodiment of 100 Hz which is then applied to a capacitor C2 which filters and smooths to supply a DC voltage. This smoothed DC voltage is then applied to a regulator Reg 1 which outputs a fixed DC voltage in this instance 12 volts which in conjunction with capacitor C3 provides a regulated 12 volt supply. Resistor R2 applies the voltage output from the bridge B1 to the externally mounted LED 16 which indicates that power is supplied to the circuit. The resistor R2 limits the current flowing to the LED 16.

The resistor R4, Zener diode Z1 and capacitor C4 form a further power supply (VCC), preferably a 5 volts DC supply, to be applied to the signal generator circuit 19. Alternatively, a further regulator may be used to supply a regulated output for supply to the circuit 19.

The signal generating circuit 19 is primarily formed about a quad and gate Schmitt trigger which in this embodiment comprise a type 4093 CMOS Integrated Circuit U1 which has four separate gates designated U1:A, U1:B, U1:C and U1:D. The gates U1:B, U1:C and U1:D are used as oscillators as described below.

The gate U1:C forms an oscillator 22 with resistor R13 and capacitor C11 whose normal frequency of oscillation as determined by resistor R13 and capacitor C11 is 10 Hz. The gate U1:D is configured as an oscillator 23 with resistor R16 and capacitor C13 which set the normal frequency of oscillation at 7 KHz. Both oscillators 22 and 23 provide a positive going square wave output. The output of the oscillator 23 is connected to the input of the oscillator 22 though resistors R13 and R14 and capacitor C12 which is charged and discharged by the output of the oscillator 23 to apply a modulating signal to the input of the oscillator 22. The output of the oscillator 22 is thus a modulated positive going square wave of the form illustrated schematically at 24 where frequency varies as determined by the output of the oscillator 23. The average frequency of this output signal is 3.8 KHz.

This output signal is applied via resistor R12 to the base of a transistor Q4 and the varying frequency of the signal 24 serves to switch transistor Q4 on and off at the varying frequency. The purpose of R12 is to limit the current to the base of transistor Q4.

The gate U1:B in is connected with resistor R10 and capacitors C9 and C10 for form a further oscillator 25 whose output is normally a positive going square wave. As with the oscillators 22 and 23, the frequency of this oscillator is controlled by the values of its associates resistor and capacitor in this case resistor R10 and capacitors C9 and C10. The oscillator 25 would normally run at a frequency of 2.6 KHz. The capacitors C9 and C10 are connected in series and are of the same value so that the capacitance of the series capacitors C9 and C10 is half the total capacitance of the capacitors. This oscillator 25 is modulated by the output signal 24 of the oscillator 22 applied through the transistor Q4. The capacitors C9 and C10 are connected to the collector of the transistor Q4 which when switched on and off the shunts the capacitor C9 to ground at a frequencies determined by the variable frequencies of the output signal 24. The effect of this switching is to double the capacitance of the series capacitors C9 and C10 every time the transistor Q4 is switch on. This therefore halves the output frequency at output of the oscillator 25.

The output of the oscillator 25 is connected via an R-C circuit formed by resistor R9 and capacitor C8 to a Darlington pair of transistors Q3 and Q2 which amplify the signal and apply the amplified signal to the positive plate of a capacitor C6. The capacitor C6 isolates DC voltages at the more negative plate and applies the signal to the coil 13 via a connector J2. When the coil 13 is connected, the signal passes through the coil 13 and returns to the ground via resistor R7. The signal applied to the coil 13 as indicated at 26 comprises a positive going square wave and a negative spike which returns through an exponential curve to zero.

The fourth gate U1:A of the integrated circuit U1, is used as a detector to show that the coil 13 is operating. Resistors R5 and R11 form a voltage divider connected to the voltage VCC and applying an input to the gate U1:A. The input of the gate U1:A is also connected via capacitor C5 and resistor R6 to the coil 13.

When the coil 13 is not connected or operating the voltage applied by the voltage divider R5 and R11 to the input of the gate U1:A causes the output of the gate U1:A to be low. When the coil 13 is operating, the input voltage to the gate U1:A is lowered by capacitor C5 AC coupling this voltage to R6. When the input voltage goes below the trip point of the Schmitt trigger U1:A, the output of the gate U1:A goes high thus supplying a voltage to resistor R3 which is connected to the base of transistor Q1 and serves to limit the current to the transistor Q1. When this current limited voltage is applied to the transistor Q1 and current limiting resistor R1 and thus is illuminated when the coil 13 is connected and operating. Thus LED 17 serves as a coil operating indicator.

When the coil 13 is removed or not operating the transistor Q1 is switched off due to an absence of base current and the LED 17 goes out. Both LED 16 and LED 17 are preferably connected externally through connector J3.

The output to the coil connector or jack J2 comprises a jumble or range of frequencies generated by the gated U1:C and U1:D. As stated above both U1:C and U1:D are connected as separate oscillators with the output of U1:D being applied to the input of U1:C. The oscillator 22 including gate U1:C provides substantially higher frequency than the oscillator circuit 23 which includes gate U1:D. Thus if disconnected from each other, the oscillator 22 of U1:C will provide a frequency of approximately 10 Hz and that of U1:D approximately 7 KHz. The combined circuit generates a sweep of frequencies usually in the range of 1 KHz to 7 KHz.

It is however within the scope of the present invention to provide an oscillator circuit which provides a single frequency output or a range of frequencies beyond the above range for application to the coil. Appropriate frequency selection is made in accordance with the nature of the cell growth and/or the quality of water flowing through the pipe.

Figure 3:
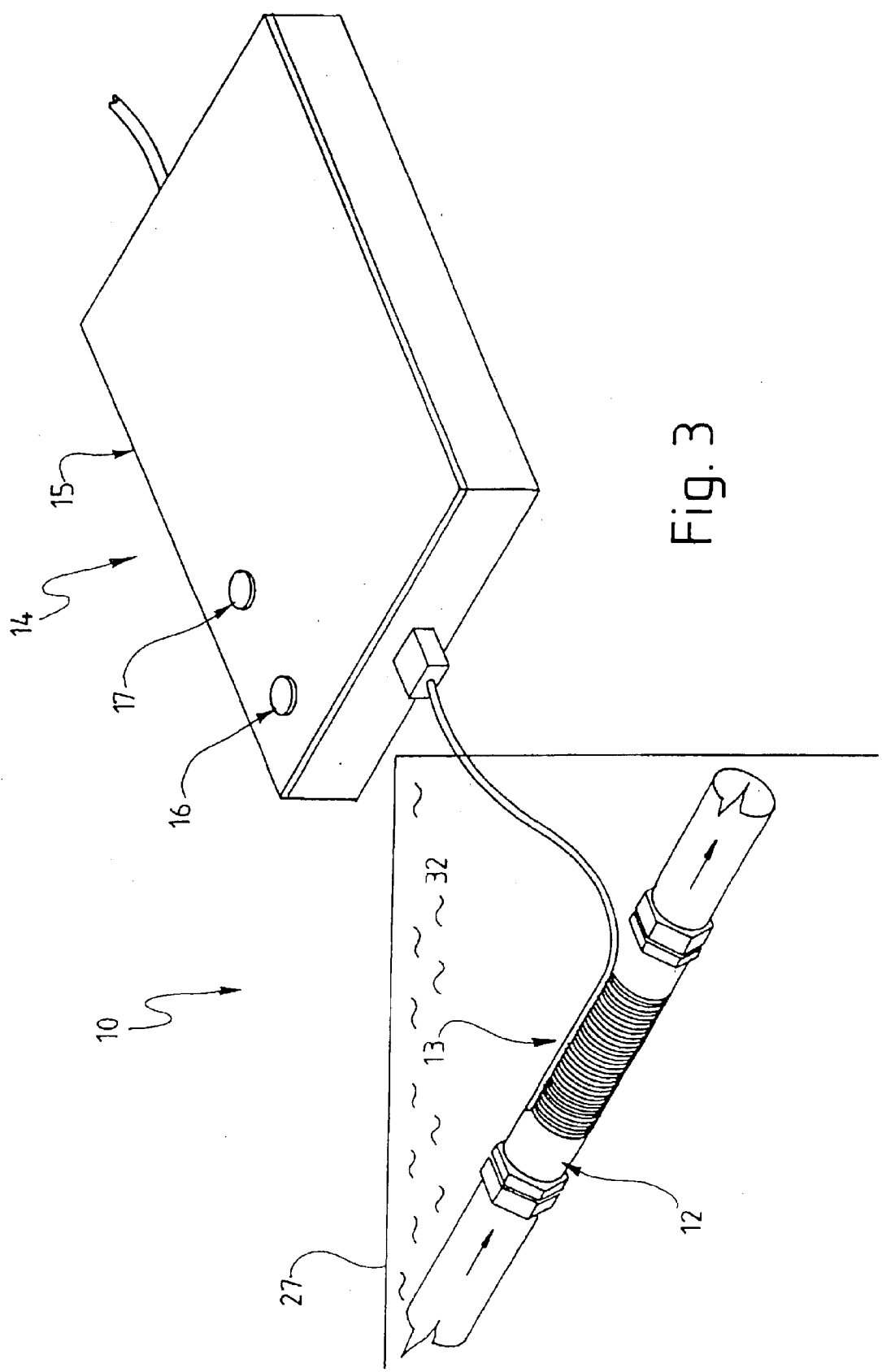
FIG. 3 illustrates the application of the apparatus of the invention to a swimming pool.

In use and as shown in FIG. 3, the apparatus of the invention may be suitably applied to an installation 27 representing a swimming pool. The former 12 carrying the coil 13 is located about the pipe 12 and is placed in the pool below the surface of the water. The signal generator 14 housed in the housing 15 is mounted in any suitable location and connected to the coil 13 through the wires 32.

Figure 4C:
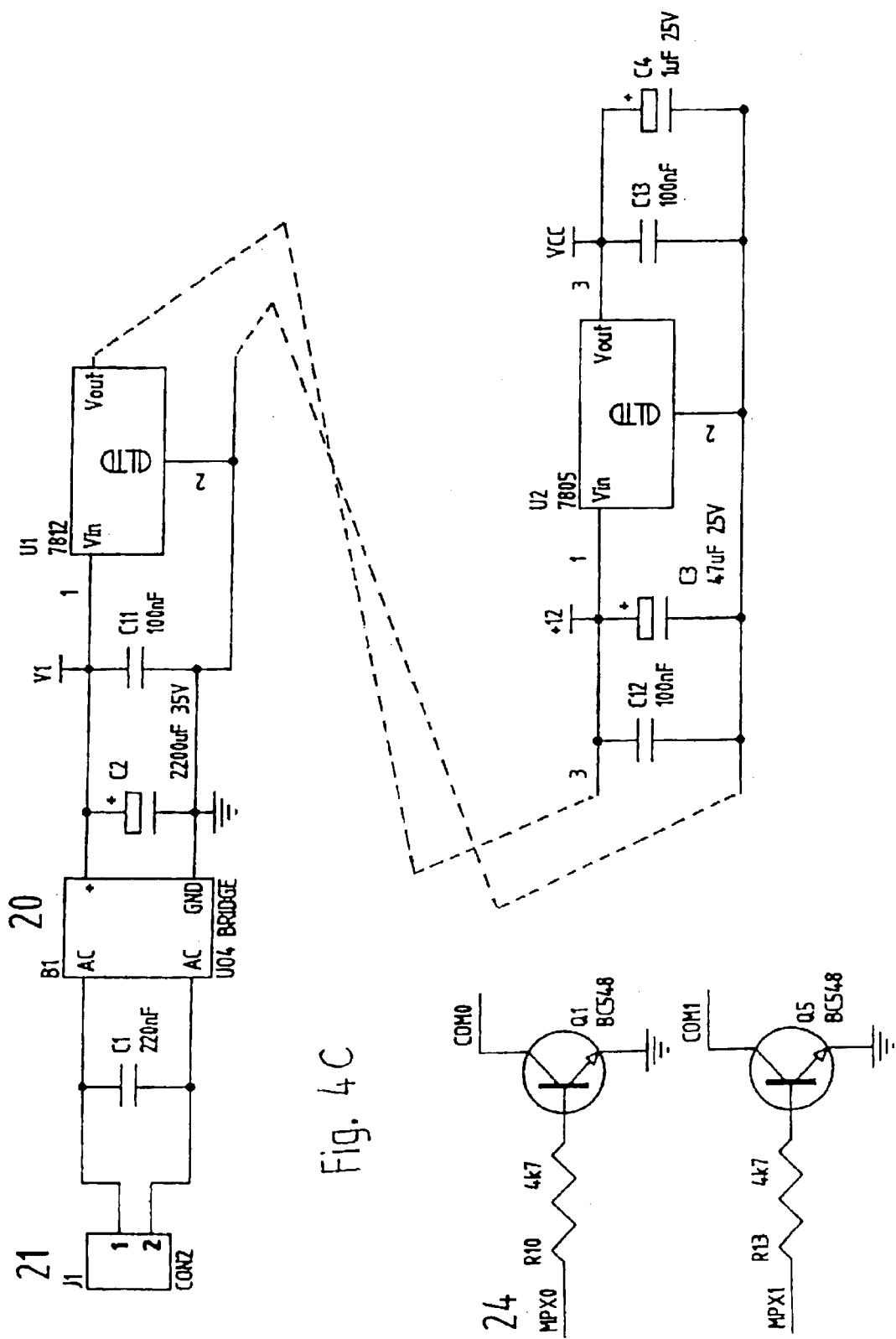
FIG. 4 is a circuit diagram of an alternative circuit for generating and applying a signal to a pipe with water flowing therethrough.

With respect to FIG. 4 of the drawings, and in accordance with a further aspect of the present invention a signal is primarily generated from a single-ship microcontroller 22 which in this embodiment comprises a type PIC 16C73A microcontroller. The 4.00 MHZ crystal X1 and two 15 pF capacitors C17 and C18 form the base frequency oscillator for the microcontroller. C14 and C15 serve as by-pass capacitors that stabilize the power supply to the microcontroller. The DS1233–10 reset unit ensures the microcontroller starts successfully on every power up.

The microcontroller generates an internal square wave signal at 10 Hz modulated at 7 kHz producing a signal with an average frequency of 3.8 kHz. This signal is used to vary the frequency of a third oscillator, the third oscillator normally running at a frequency of 2.6 kHz. The effect of the signal applied to this third oscillator is that it will have the frequency of the third oscillator every time the signal goes high and return the third oscillator to its normal frequency when the signal goes low. The output of this third oscillator RCO (CDRV) is applied via an RO-C circuit formed by resistor R9 and capacitor C8 to a Darlington pair of transistors Q3 and Q2 which amplify the signal to the positive plate of a capacitor C6. The capacitor C6 isolates DC voltages at the more negative plate and applies the signal to the coil 13 via a connector J2. When the coil 13 is connected, the signal passes through the coil 13 and returns to ground via resistor R7. The signal applied to the coil 13 as indicated at 26 comprises a positive going square wave and a negative spike which returns through an exponential curve to zero. Resistors R5 and R11 form a voltage divider connected to the voltage VCC and applying an input to the microcontroller at RBO (CFB). This input is also connected via capacitor C5 and resistor R6 to the coil 13 and is used as a detector to show that the coil 13 is operating.

When the coil 13 is not connected or operating the voltage applied by the voltage divider R5 and R11 to the input of the microcontroller is low and the microcontroller turns LED 17 off. If the coil 13 is connected and operating the input voltage goes high and the microcontroller turns LED 17 on. Thus LED 17 serves as a coil operating indicator. The base frequencies for operation are stored in a serial Electrically Erasable Programmable Read Only Memory (EEPROM) U5 which in this case is a PIC24CO4AP. These frequencies may be changed to suit a particular application by means of adjusting via two push-buttons PB1 and PB2 and displays DSP1 and DSP2. These pushbuttons and displays are preferably located on an additional board that is able to plug into the main system board, thereby limiting the ability to change frequencies to only those that are authorized to do so.

Transistors Q1 and Q5 serve to multiplex the display of numbers. A number display may be applied to DSP1 only by the microcontroller turning on Q1 and turning off Q5. To display a number on DSP2 the microcontroller turns on Q5 and turns off Q1. By alternating this process at approximately 60 times a second, the human eye will not be able to detect any amount of flickering due to the displays repeatedly being switched on and off.

Figure 5:
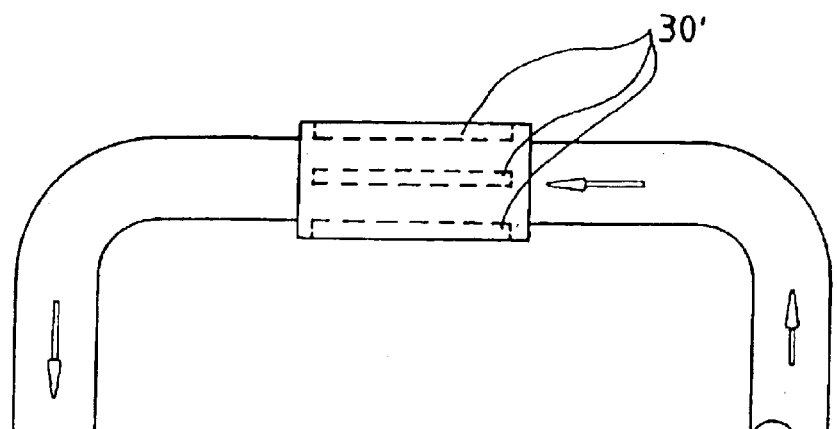
FIG. 5 is a view of a section of pipe from a swimming pool filtration system having apparatus according to the present invention attached thereto.
Figure 6:
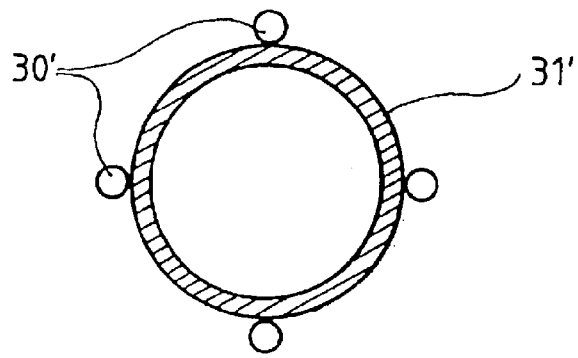
FIG. 6 is a cross-sectional view of a pipe of a swimming pool installation having robes of the present invention positioned therein.
Figure 7:
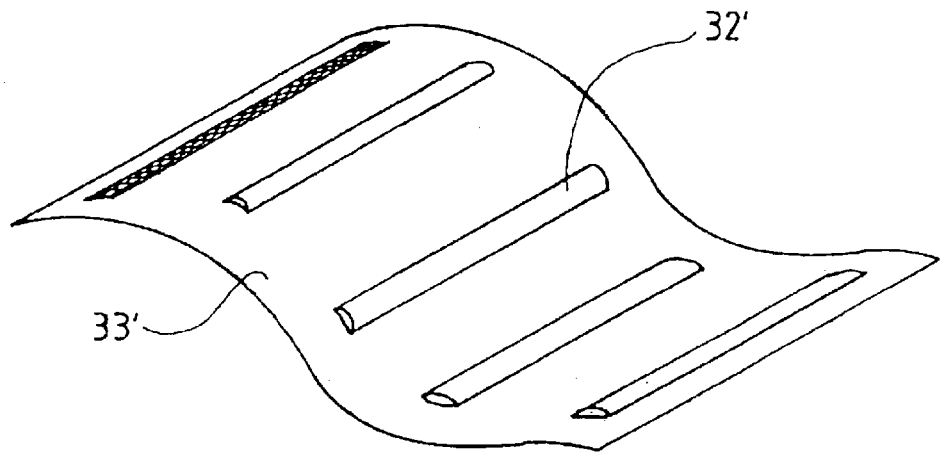
FIG. 7 is a perspective view of the pipe band in accordance with another aspect of the present invention.

FIGS. 5 to 7 of the drawings illustrates a section of piping in a swimming pool installation to which probes of an apparatus according to another aspect of the present invention are attached. A plurality of probes 30' having electrical connection to the output of the signal generating apparatus of FIG. 4 are positioned on the outer surface of a section of pipe 31'. The probes 30' may be in the form of elongate bars of a ferrite material. Our trials to date have indicated that manganese-zinc supplied by NEOSID AUST. PTY LIMITED and identified by the code F8 is a suitable material. Good results have been achieved by using one to five probes 30'. According to data provided by NEOSID AUST. PTY LIMITED their F8 coded ferrite material has an optimum frequency range of between 0.1 and 0.5 MHz. A convenient manner of attaching the probes is to enclose individual probes within equally spaced pockets 32' of a band 33'. The band 33' can be mounted on a section of pipe and secured using Velcro or like attachments.

The probes 30' are each wound with a coil and separately electrically connected to the output of the signal generating apparatus.

When two or more probes are fixed to a pipe multiple overlapping frequencies can be applied to fluid within a pipe. Such an arrangement provides the flexibility to treat the whole of a body of water in pipes of varying sizes and overcomes the disadvantage of a treatment system using a single coil wound on a pipe or sleeve in which inner portions of the body of water may not be reached or affected.

The use of the method and apparatus of the present invention should thus at least reduce the costs of maintaining a healthy water supply by means which are both more environmental friendly and more acceptable to the general community.

It will be appreciated that the above examples are illustrative only of the present invention and that modifications and alterations can be made thereto without departing from the inventive concept as hereinbefore described.

What is claimed is:

1. A method for the removal of bacteria, microbes and other cell growth from a body of water comprising sequentially applying an electromagnetic field of varying frequencies and ranges to a section of pipe or similar conduit communicable with the body of water as water passes therethrough for the purpose of inhibiting or removing said bacteria, microbes or other cell growth from said water wherein the application of the electro magnetic field to said section of pipe is achieved by magnetizing an element or elements comprising elongate strips of ferrite material positioned on an outer wall of the pipe or conduit and extending lengthwise of the axis of the pipe to create multiple overlapping magnetic fields.

2. A method as claimed in claim 1 wherein the ferrite material is manganese-zinc.

3. A method as claimed in claim 1, wherein the element or elements are magnetized by a coil.

4. A method as claimed in claim 1 wherein three sequentially varying frequencies and levels of magnetic field are applied to said pipe.

5. Apparatus for performing the method of claim 1 said apparatus comprising:
- a magnetizable element adapted to be disposed about a section of a pipe communicable with the body of water,
- means for applying a signal to said magnetizable element to create an electro-magnetic field within said pipe which sequentially varies the frequencies and ranges of the field in order to inhibit or remove said bacteria, microbes or other cell growth from said water wherein the magnetizable element comprises one or more elongate ferrite elements place on an outer wall of the section of pipe.

6. Apparatus as claimed in claim 5 wherein the one or more elongate ferrite elements are manganese-zinc elements.

7. Apparatus as claimed in claim 5 wherein the magnetizable element is a coil for application of the electromagnetic field to the pipe or conduit the coil being wound about a polyvinyl chloride (PVC) or other non-ferrous former which is located coaxially about the pipe or conduit.

8. Apparatus claimed in any one of claim 5 wherein an AC voltage is applied to the magnetizable element to generate the electro-magnetic field.

9. Apparatus as claimed in claim 8 wherein the voltage is 5 volts AC.

10. Apparatus as claimed in claim 5 wherein the frequency of the voltage applied to the magnetizable element varies to sweep a range of frequencies in the range of 2 KHz to 7 KHz.

11. Apparatus as claimed in claim 5 wherein the signal applied to the magnetizable element is in the form of a positive going square wave followed by a negative going spike having a variable frequency.

12. Apparatus as claimed in claim 5 wherein means for generating the signal comprises first and second square wave oscillators whereby the output of the second oscillator is modulated in frequency by the output of the first oscillator.

13. Apparatus as claimed in claim 5 wherein the signal generating means also include a third square wave oscillator whereby the output of the second oscillator is used to frequency modulate the output of the third square wave oscillator.

14. Apparatus as claimed in claim 13 wherein amplifier means are employed for amplifying the output of the third square wave oscillator, the output of the amplifier means is adapted to be connected to the magnetizable element via capacitance means to define the required form of the signal.

* * * * *